(12) United States Patent
Masters

(10) Patent No.: US 8,108,554 B1
(45) Date of Patent: Jan. 31, 2012

(54) METHOD AND SYSTEM FOR AUTOMATICALLY MAPPING SECURE NETWORK ADDRESS TRANSLATIONS

(75) Inventor: Richard Roderick Masters, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 11 days.

(21) Appl. No.: 12/259,142

(22) Filed: Oct. 27, 2008

Related U.S. Application Data

(63) Continuation of application No. 10/147,629, filed on May 16, 2002, now abandoned.

(51) Int. Cl.
G06F 15/16 (2006.01)
G06F 15/173 (2006.01)

(52) U.S. Cl. .................. 709/245; 709/218; 709/238

(58) Field of Classification Search .......... 709/222–226, 709/238–245
See application file for complete search history.

(56) References Cited

U.S. PATENT DOCUMENTS

| | | | |
|---|---|---|---|
| 5,473,599 A | 12/1995 | Li et al. | |
| 5,793,763 A | 8/1998 | Mayes et al. | |
| 6,052,718 A * | 4/2000 | Gifford | 709/219 |
| 6,195,705 B1 | 2/2001 | Leung | |
| 6,243,754 B1 | 6/2001 | Guerin et al. | |
| 6,353,614 B1 | 3/2002 | Borella et al. | |
| 6,490,289 B1 | 12/2002 | Zhang et al. | |
| 6,665,702 B1 | 12/2003 | Zisapel et al. | |
| 6,779,035 B1 * | 8/2004 | Gbadegesin | 709/228 |
| 7,042,876 B1 | 5/2006 | Jayasenan et al. | |
| 7,131,141 B1 * | 10/2006 | Blewett et al. | 726/12 |
| 7,551,574 B1 * | 6/2009 | Peden et al. | 370/310.2 |
| 2002/0152325 A1 | 10/2002 | Elgebaly et al. | |
| 2003/0009585 A1 * | 1/2003 | Antoine et al. | 709/238 |
| 2003/0033459 A1 | 2/2003 | Garnett | |
| 2003/0065787 A1 | 4/2003 | Osafune et al. | |
| 2003/0069973 A1 | 4/2003 | Ganesan et al. | |
| 2003/0106067 A1 | 6/2003 | Hoskins et al. | |
| 2003/0110262 A1 | 6/2003 | Hasan et al. | |
| 2003/0126233 A1 | 7/2003 | Bryers et al. | |
| 2003/0172170 A1 | 9/2003 | Johnson et al. | |
| 2003/0195984 A1 | 10/2003 | Zisapel et al. | |
| 2004/0215752 A1 | 10/2004 | Satapati et al. | |

OTHER PUBLICATIONS

Egevang, K., RFC 1631, Network Working Group, The IP Network Address Translator (NAT), May 1994, pp. 1-10.
Hasenstein, M., IP Address Translation, 1997, 50 pgs.
Srisuresh, P. et al., RFC 2663, NAT Terminology and Considerations, Aug. 1999, 30 pgs. Blade Server—A Search390 Definition, http://search390.techtarget.com/sDefinition/0,,sid10_gci770169,00.html, Jan. 15, 2002, 2 pgs.
VisualRoute—The Visual Traceroute Utility, printer from the May 11, 2001 archive of "www.visualware.com/visualroute/index.html", 2 pgs.

\* cited by examiner

*Primary Examiner* — Yasin Barqadle
(74) *Attorney, Agent, or Firm* — Frommer Lawrence & Haug LLP; John W. Branch

(57) ABSTRACT

Disclosed is a system and method for providing persistence in network access, by enhancing the likelihood that a gateway that is employed by a server array controller to send a client's message to a resource in another network outside of a local network behind the server array controller, is the same gateway employed by the resource for a responding message. In one embodiment, an outbound gateway is selected based on load-balanced gateways that have been enabled for automatic mapping of a source address to an available corresponding global Internet Protocol address. In another embodiment, multiple server array controllers are employed in a multi-active mode that enables multiple network address translation tables to be available in the event of a failover of one or more of the server array controllers.

17 Claims, 11 Drawing Sheets

1010

WITHOUT AUTOMATIC MAPPING:

SNAT MAP CLIENT 1 CLIENT 2 TO {10.1.0.4, 10.1.0.5}

SNAT MAP CLIENT 3 TO 10.2.0.5

| SOURCE COMPUTER | SOURCE COMPUTER'S IP ADDRESS | NAT ROUTER'S IP ADDRESS |
|---|---|---|
| CLIENT 1 | 192.166.1.1 | 10.1.0.4 |
| CLIENT 2 | 192.166.1.2 | 10.1.0.5 |
| CLIENT 3 | 192.166.1.3 | 10.2.0.5 |

1012

1020

WITH AUTOMATIC MAPPING:

SNAT MAP CLIENT 1 CLIENT 2 CLIENT 3 TO AUTO

| SOURCE COMPUTER | SOURCE COMPUTER'S IP ADDRESS | NAT ROUTER'S IP ADDRESS |
|---|---|---|
| CLIENT 1 | 192.166.1.1 | AUTO - SELECTED |
| CLIENT 2 | 192.166.1.2 | AUTO - SELECTED |
| CLIENT 3 | 192.166.1.3 | AUTO - SELECTED |

| Version | Header Length | Type of Service | Total Length |
|---------|---------------|-----------------|--------------|
| Identification | | Flags | Fragment Offset |
| Time to Live | Protocol | Header Checksum | |
| Source Address | | | |
| Destination Address | | | |
| Options | | | |
| Data (variable length) | | | |

*Fig. 11.*

METHOD AND SYSTEM FOR AUTOMATICALLY MAPPING SECURE NETWORK ADDRESS TRANSLATIONS

CROSS REFERENCE TO RELATED APPLICATIONS

This application is a continuation patent application of U.S. patent application Ser. No. 10/147,629, filed May 16, 2002, entitled "Method And System For Automatically Mapping Secure Network Address Translations," and claims benefit under 35 U.S.C. §120, and which is incorporated herein by reference.

FIELD OF THE INVENTION

The present invention relates generally to persistent network access, and more particularly to automatically mapping secure network address translations (SNAT) to maintain a persistent network access to the Internet.

BACKGROUND OF THE INVENTION

With the explosion of the Internet, organizations such as businesses, non-profit foundations, schools, and the like, are fast making reliable connections to the Internet an integral part of their networking strategy. However, in order to reduce the chance of a potential catastrophic shutdown, organizations are establishing multiple points of connection to the Internet. Organizations that desire the additional reliability often establish multiple connections through several different Internet Service Providers (ISP(s)). Each ISP then assigns an IP address or range of IP addresses to the organization for Internet access. Network border routers, using network address translators (NAT), are then employed by the organization to manage their Internet access using the ISP assigned addresses.

In addition to the potential for increased reliability, maintaining connections through multiple ISP(s) enables the organization to perform load-balancing by lowering the number of internal organization nodes (or devices) linking to the Internet through a single link. By distributing the load through multiple links the organization may optimize performance and significantly reduce wait times.

While reliability and performance considerations have contributed to increased deployment of multiple Internet connections, such implementations are not without their perils. For example, in the ideal situation, when the connectivity through one ISP fails, connectivity through the other ISP(s) is expected to enable the organization to preserve its connectivity to the Internet, and thereby reduce potential impact to the organization. However, a problem can occur when one ISP fails.

When one ISP fails, outbound traffic must be rerouted to take advantage of another available ISP connection. However, there is no way to control the ISP used for returning network traffic. Because the ISP used for the return traffic is not selectable by the organization, there is a high likelihood that responses to outbound traffic will result in incomplete transactions for the organization, and potentially lost profits. The inability to manage the return network traffic route will also result in an inability for the organization to balance its incoming Internet traffic.

SUMMARY OF THE INVENTION

This summary of the invention section is intended to introduce the reader to aspects of the invention and is not a complete description of the invention. Particular aspects of the invention are pointed out in other sections herein below and the invention is set forth in the appended claims, which alone demarcate its scope.

Briefly, described is a system and method for providing persistence in a network access by enhancing the likelihood a gateway that is employed for sending a client message outside of a client's network is the same gateway employed for receiving a message response. In one aspect of the invention, an outbound gateway is selected based on load-balanced gateways that have been enabled for automatic mapping of a source address to an available corresponding global Internet Protocol address. In another aspect of the present invention, multiple server array controllers are employed in a multi-active mode for the automatic mapping of global addresses associated with particular gateways. This enables one server array controller to actively manage multiple network address translation tables in the event of a failover of one or more of the server array controllers.

In accordance with one aspect of the present invention, a method is directed to translating a client network address to a global network address. The method includes receiving a request from a client to send a message to a destination address outside of the client's network. The client network address is translated for transmission to the destination address by selecting the global network address that corresponds to a selected gateway. A response from the destination address is received through the selected gateway, and transmitted from the destination address to the client by employing a retranslation of the global network address to the client network address.

A more complete appreciation of the present invention and its improvements can be obtained by reference to the accompanying drawings, which are briefly summarized below, to the following detailed description of illustrative embodiments of the invention, and to the appended claims.

BRIEF DESCRIPTION OF THE DRAWINGS

The foregoing aspects and many of the attendant advantages of the present invention will become more readily appreciated as the same becomes better understood by reference to the following detailed description, when taken in conjunction with the accompanying drawings, wherein:

FIG. 10 illustrates an embodiment of source-destination network address translation (NAT) tables with and without automatic mapping of addresses; and FIG. 11 illustrates an embodiment of a typical IP packet format, in accordance with the present invention.

DETAILED DESCRIPTION OF THE PREFERRED EMBODIMENT

Figure 1:
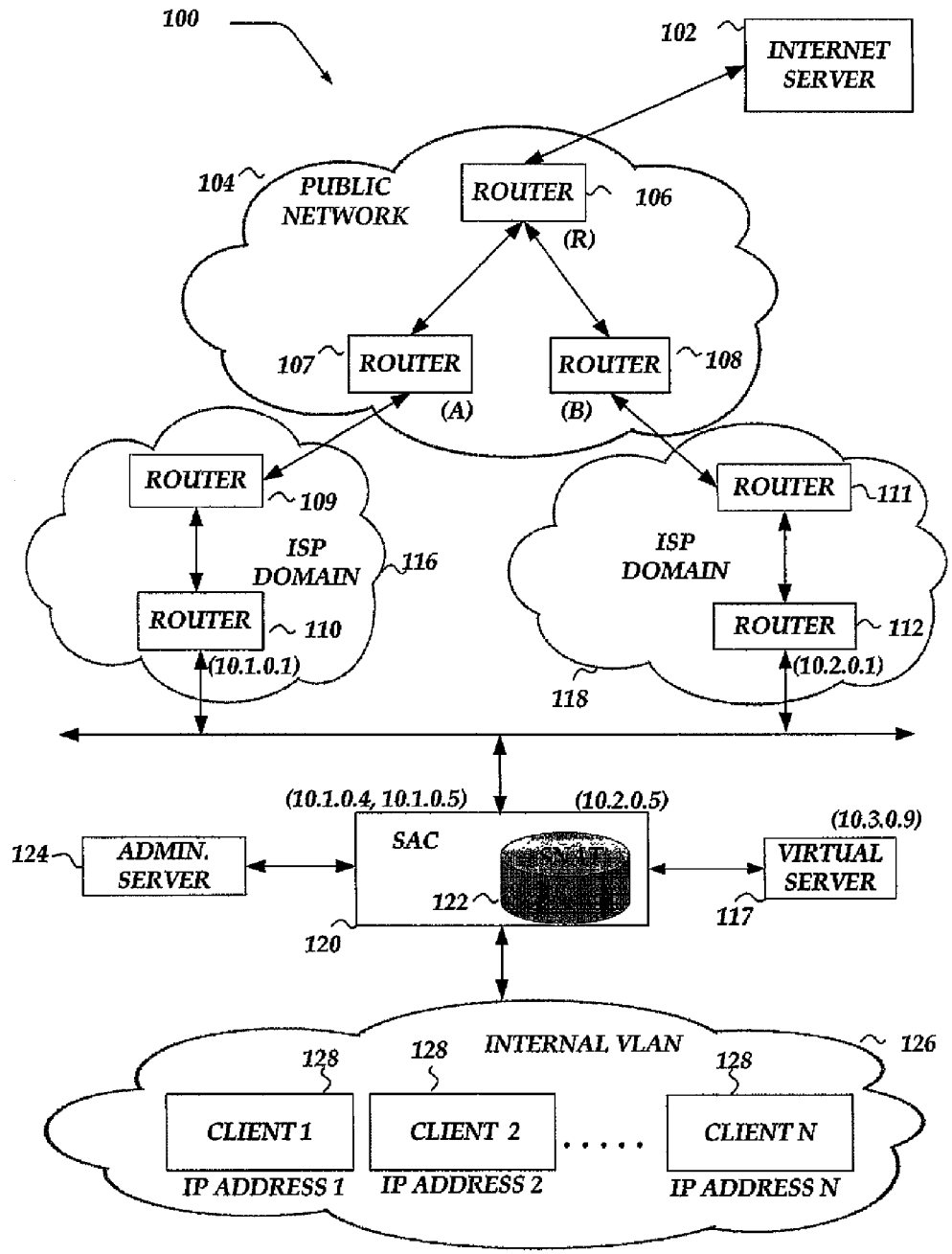
FIG. 1 illustrates a schematic system diagram of an exemplary embodiment.

In the following detailed description of exemplary embodiments of the invention, reference is made to the accompanied drawings, which form a part hereof, and which are shown by way of illustration, specific exemplary embodiments of which the invention may be practiced. These embodiments are described in sufficient detail to enable those skilled in the art to practice the invention, and it is to be understood that other embodiments may be utilized, and other changes may be made, without departing from the spirit or scope of the invention. The following detailed description is, therefore, not to be taken in a limiting sense, and the scope of the invention is defined only by the appended claims. Referring to the drawings, like numbers indicate like parts throughout the views.

Throughout the specification, and in the claims, the meaning of "a", "an", and "the" include plural references. The meaning of "in" includes "in" and "on".

Briefly stated, the present invention is directed at providing a method and system for automatically selecting a global IP network address that corresponds to an available gateway, e.g., an ISP gateway, for network address translation for a message that is communicated from a source on a local network to a destination on a global network. Further, since the selected global IP network address is employed by the destination to reply to the message, the original available gateway will be used to communicate a response to the source on the local network.

In one embodiment, an outbound gateway is selected based on load-balanced gateways enabled for automatically mapping a source address of a message to a corresponding global address. Next, the message is forwarded to a resource at the message packets.

In another embodiment, multiple server array controllers are employed in a multiple active mode, during automatic mapping of gateways.

Prior to describing the invention in greater detail, a list of some terms and their definitions is provided below.

Definition of Terms

TCP/IP Protocol—Generally, the term Internet refers to the worldwide collection of networks and gateways that use a Transmission Control Protocol/Internet Protocol ("TCP/IP") suite of protocols to communicate with one another. At the heart of the Internet is a backbone of high-speed data communication lines between major nodes or host computers, including commercial, government, educational, and other computer systems, that route data and messages.

The TCP/IP protocol may be viewed as a two-layer protocol. The upper layer is Transmission Control Protocol (TCP). The TCP manages the assembling of a message or file into smaller packets (see below) that are then sent over a network, such as the Internet. The lower layer of the two-protocol that handles the addresses of each packet is known as Internet Protocol (IP). The TCP/IP protocol model is also described by a five-layer model, composed of: a physical, a data link, a network, a transport, and an application layer. The network layer provides for the movement of packets between communicating endpoints on the Internet.

Briefly, FIG. 11 illustrates a typical protocol message format employed in communications, known as an IP packet, IP message packet, or sometimes as a message packet. The IP packet is configured to include communications information from a sender, along with additional information to enable the message to reach its destination. The additional information includes a sender's IP address, known as a source address, along with an intended receiver's IP address, known as a destination address.

For a computer to communicate with other computers on the Internet, it typically has an IP address. The present version of IP protocol (Ipv4) provides a theoretical $2^{32}$ unique addresses. The actual number of available addresses may be less however, due to the manner in which the addresses are partitioned and allocated. With the explosion of the Internet and the increase in home and business networks, the number of available IP addresses appears to be insufficient. Thus, a redesigned address format protocol (Ipv6) has been developed to enable more addresses. However, the implementation of Ipv6 appears to require a significant modification to the infrastructure of the Internet. Therefore, a solution to the IP address depletion problem is to reuse addresses through network address translations (NATs).

Network Address Translations (NAT) NAT (described in RFC 1631) provides IP address translations allowing a single device, such as a router, to act as an agent between the Internet (public network) and a local (private) network, enabling a single, unique IP address to represent the enterprise. A NAT enabled device is typically placed at the borders of stub domains, where a stub domain is a network domain, such as a corporate network, LAN, or VLAN that only handles traffic originated or destined to nodes (or devices) in that domain. When a NAT enabled device is employed, the IP address space is typically partitioned into two parts—a reusable set of IP addresses internal to the stub domains, and a set of globally unique IP addresses. The reusable IP addresses are typically called internal local IP addresses, or local addresses. The global IP addresses are termed global addresses or outside global addresses. A given address is either a local address or a global address. NAT enabled devices include a table comprising of pairs of local addresses and global addresses. The IP addresses inside the stub domain, the local addresses, typically are not globally unique. Therefore, they may be reused in other domains. Additionally, the local addresses are not registered, thereby reducing costs to an organization of registering a unique IP address for every node within the organization. As the global IP addresses are used to communicate to the Internet, these addresses typically need to be registered.

Network Address Translations not only provide for mapping of a local (unregistered) address to a registered global address, but through a concept known as overloading, a NAT enabled device may also be employed to map multiple local addresses to a single global address by using different ports. NAT overloading employs a feature of the TCP/IP protocol stack called multiplexing to enable a computing device to maintain several concurrent connections with a remote device through different ports.

Port numbers for both the source address and destination address of a message packet is typically stored in a TCP header. Each port number employs 16 bits, thereby providing for a possible $2^{16}$ or 65,536 values.

Server Array Controller (SAC)—A server array controller (SAC) manages and balances network traffic on a network, such as an intranet. One embodiment of a SAC is the "BIG-IP" server array controller produced by F5 Networks, Incorporated of Seattle, Wash. The SAC intelligently distributes site connections across arrays of servers, transparent firewalls, transparent cache servers, routers as well as other router-like devices. The SAC is designed to manage connections to multiple Internet or intranet sites, and it supports a wide variety of Internet protocols and services such as TCP/IP and HTTP. In addition, the SAC monitors several aspects of the node servers that deliver content associated with a domain name.

Secure Network Address Translation (SNAT)—A Secure Network Address Translation (SNAT) enabled device provides additional security to Network Address Translators by a variety of approaches. For example, a SNAT enabled device might allow only local network connections to be initiated from the local (private) network client and not from an Internet client. Although the description below has been directed towards employing a SNAT enabled device to provide for network address translations, this should not be construed as limiting the scope of the invention but as merely providing an illustration of an embodiment of this invention. For example, the address translations could be performed by employing a non-secure NAT enabled device, without departing from the spirit or scope of the invention.

Virtual Server—A virtual server arises where multiple servers (see FIG. 4 and its related discussion on server computers) appear as one server, or one system image, to an operating system or for network administration. A virtual server may also maintain more than one server on one machine. For example, a virtual server on the Internet may contain multiple Web sites, each with its own domain name, on one server.

VLAN—A Virtual Local Area Network (VLAN) is a logical subgroup of nodes (or devices) within an intranet, such as a Local Area Network (LAN) usually created by software and independent of the physical LAN segment to which the node or device is attached.

Gateway—A gateway is a combination of hardware and software that links two networks. A gateway may include a router, switch, computing device, or the like and is typically used to perform protocol conversions between different types of networks or applications. For example, a gateway can be employed to convert a TCP/IP packet to a NetWare IPX packet and vice versa, or to convert an analog voice stream, or a digitized version of the voice, into an IP packet, and so on. However, a gateway is not limited to protocol conversions. A gateway may act as a go-between two or more networks that use the same protocols. In which case, the gateway functions as an entry/egress point or node to the network. For example, a gateway may function as a proxy server, to break the connection between sender and receiver of messages. Computers that control traffic within or at an Internet Service Provider (ISP) are gateways, or ISP gateways.

Illustrative Operating Environment

FIG. 1 shows exemplary system 100 for practicing the present invention, according to one embodiment of the present invention. As seen in FIG. 1, system 100 includes Internal VLAN 126, Server Array Controller (SAC) 120, Administration (Admin) Server 124, virtual server 117, ISP domain 116, ISP domain 118, public network 104, and Internet server 102. Internal VLAN 126 includes clients 128 (1 through N). Server Array Controller 120 includes Secure Network Address Translator (SNAT) 122. ISP domain 116 includes routers 109-110. ISP domain 118 includes routers 111-112. Public network 104 includes routers 106-108.

As shown in the figure, Internet Server 102 is coupled to and in communications with public network 104, which enables communications with router 106. Router 106 is coupled to routers 107-108 and are arranged to provide various networking paths through public network 104. For example, as shown in the figure, router 107 is coupled to and in communications with router 109. Also shown in the figure, is router 109 coupled to router 110 and configured to provide a communication path through ISP domain 116. Router 108 is coupled to router 111 and provides a communication path to ISP domain 118. Router 111 is coupled to router 112 and provides a communication path through ISP domain 118.

SAC 120 is coupled to router 110, which is directed at providing communications between SAC 120 and SNAT 122, and ISP domain 116. Additionally, SAC 120 is coupled to router 112, which enables communications between SAC 120 and SNAT 122, and ISP domain 118. Also, coupled to SAC 120 is Administration Server 124, which is configured to communicate with SAC 120 and SNAT 122. Moreover, SAC 120 handles communications for virtual server 117.

Server Array Controller (SAC) 120 is also coupled to Internal VLAN 126. Internal VLAN 126 provides a communications path between clients 128 (1 through N) and Server Array Controller (SAC) 120.

Public network 104 can employ any form of computer readable media for communicating information from one electronic device to another. Also, public network 104 may include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

In FIG. 1, it will be appreciated that the public network 104 may comprise a vast number of such interconnected networks, computers, and routers and therefore only a representative "cloud" is shown employing routers 106-108.

ISP domains 116 and 118 include managed networks by organizations, business, and the like that provide access to the network 104. ISP domains 116 and 118 may comprise routers, and networking infrastructures, substantially similar to network 104. Additionally, ISP domains 116 and 118 may provide Internet web servers (not shown) to enable businesses to have a presence on the Internet. Moreover, it will be appreciated that ISP domain 116 and ISP domain 118's "clouds", and routers 109-112 are representative of the vast number of interconnected networks, high-speed leased lines, computers, routers, switches, applications, and related services and equipment that an Internet Service Provider may provide. Thus, the paths and various routers in FIG. 1 are for illustration, and the invention is not limited to this configuration. Numerous other paths, networks, computers, and configurations of routers, bridges, switches and the like are possible, without departing from the spirit or scope of the invention. For example, routers 106-112 could be represented by gateways, or ISP gateways.

Clients 128 (1 through N) are described in more detail with reference to FIG. 5 below. Briefly, however, clients 128 (1 through N) include any device capable of sending information to or receiving information from a network. Clients 128 include personal computers, multiprocessor systems, microprocessor-based or programmable consumer electronics, network PCs, minicomputers, mainframe computers, and the like.

While clients 128 (1 through N) are included within Internal VLAN 126, to isolate network traffic, improve bandwidth, and provide a level of added security, the invention is not so limited. For example, the internal network architecture employed need not be a VLAN. Thus, a LAN could be employed, without departing from the scope or spirit of the present invention.

Internet server 102 is described in more detail with reference to FIG. 4 below. Briefly, however, Internet server 102 includes any computing device that is configured to provide services, such as World Wide Web, ftp, email, dialup, and the like over a networking infrastructure, such as network 104. Moreover, Internet server 102 may include applications, databases, and the like that clients 128 (1 through N) may seek to access.

Administration (Admin) server 124 includes any computing device and related application programs that are arranged to mange back ends to a server, server group, or similar computing devices. As shown in FIG. 1, Admin server 124 is configured to provide administration services for SAC 120.

Server array controllers, such as SAC 120, are described above. Briefly, however, SAC 120 is configured to receive requests to communicate with Internet server 102 from clients 128 (1 through N). SAC 120 is also configured to receive external client (not shown) requests to communicate with clients 128 (1 through N).

For client 128 requests to communicate with Internet server 102, SAC 120 employs SNAT 122 to configure the TCP/IP packet for transmission outside of internal VLAN 126. SAC 120 is further configured to provide the configured TCP/IP packet to a selected router (router 110 or 112) for transmission through ISP domain (116 or 118) to Internet server 102. Selection of the router employed in transmission of the TCP/IP packet is described further below.

Secure Network Address Translators, such as SNAT 122 are described above. Briefly, however, SNAT 122 is arranged to select a global address corresponding to an available router (110 or 112) in response to request by client 128 (1 through N) to communicate outside of internal VLAN 126. Selection of the global address is described further below.

Figure 2:
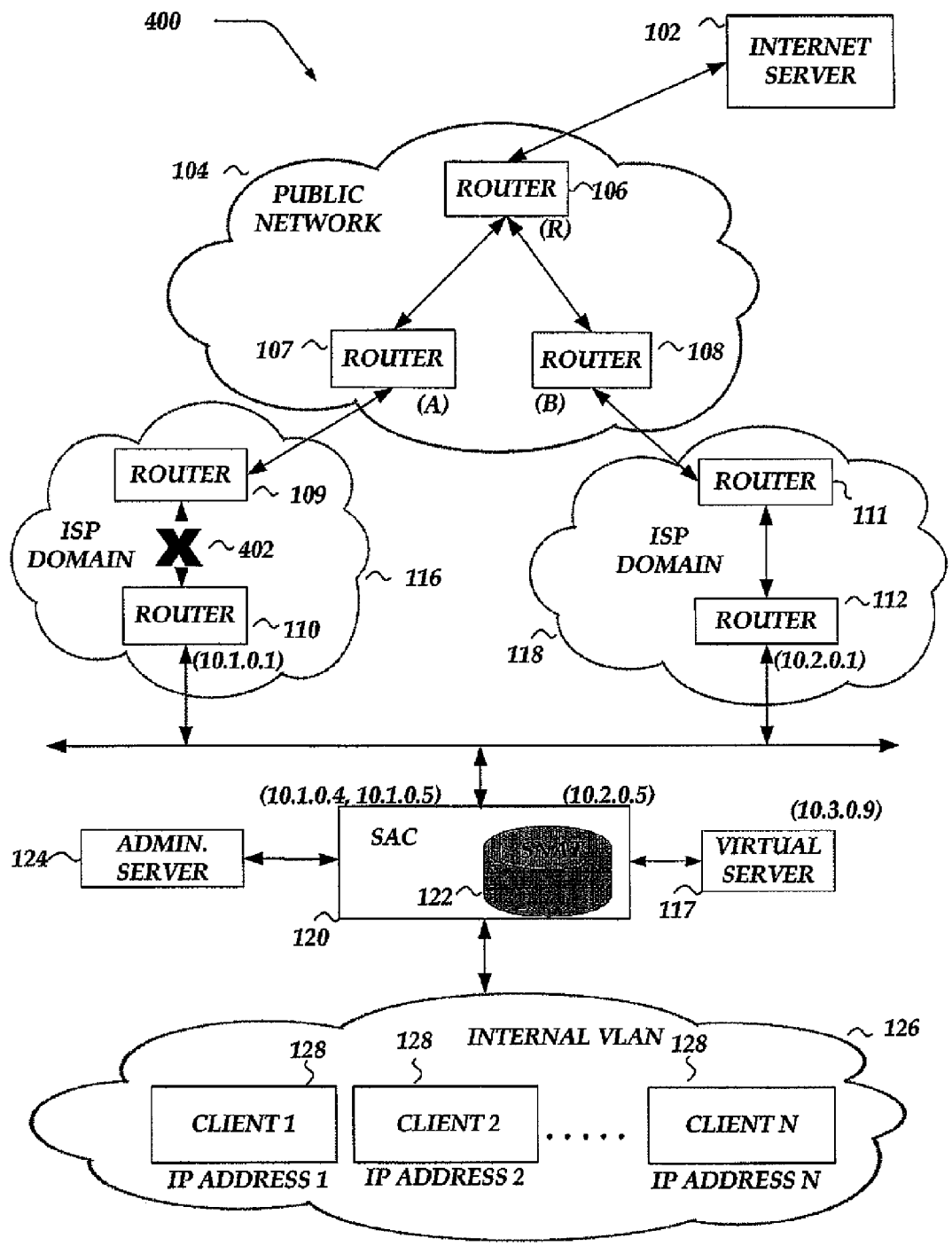
FIG. 2 illustrates schematic system diagram of a failed network path in the exemplary embodiment shown in FIG. 1.

FIG. 2 shows a schematic system diagram of a failed network path 402 in the exemplary invention shown in FIG. 1. Like components in FIG. 1 and 2 are labeled substantially the same. However, FIG. 2 illustrates a failed network path 402 in the ISP domain 116.

In FIG. 2, failed network path 402 is shown between router 109 and router 110 preventing the completion of a communications path between router 107 and router 110 by way of ISP domain 116. It is likely that ISP domains, such as ISP domain 116, employ a multitude of router paths to minimize failed communications based on a single router path failure. However, FIG. 2 does not attempt to illustrate the alternative routes that may be employed by an ISP domain. It is presumed for illustration of the invention that there are no alternative communications paths from router 107 through ISP domain 116 to router 110.

Figure 3:
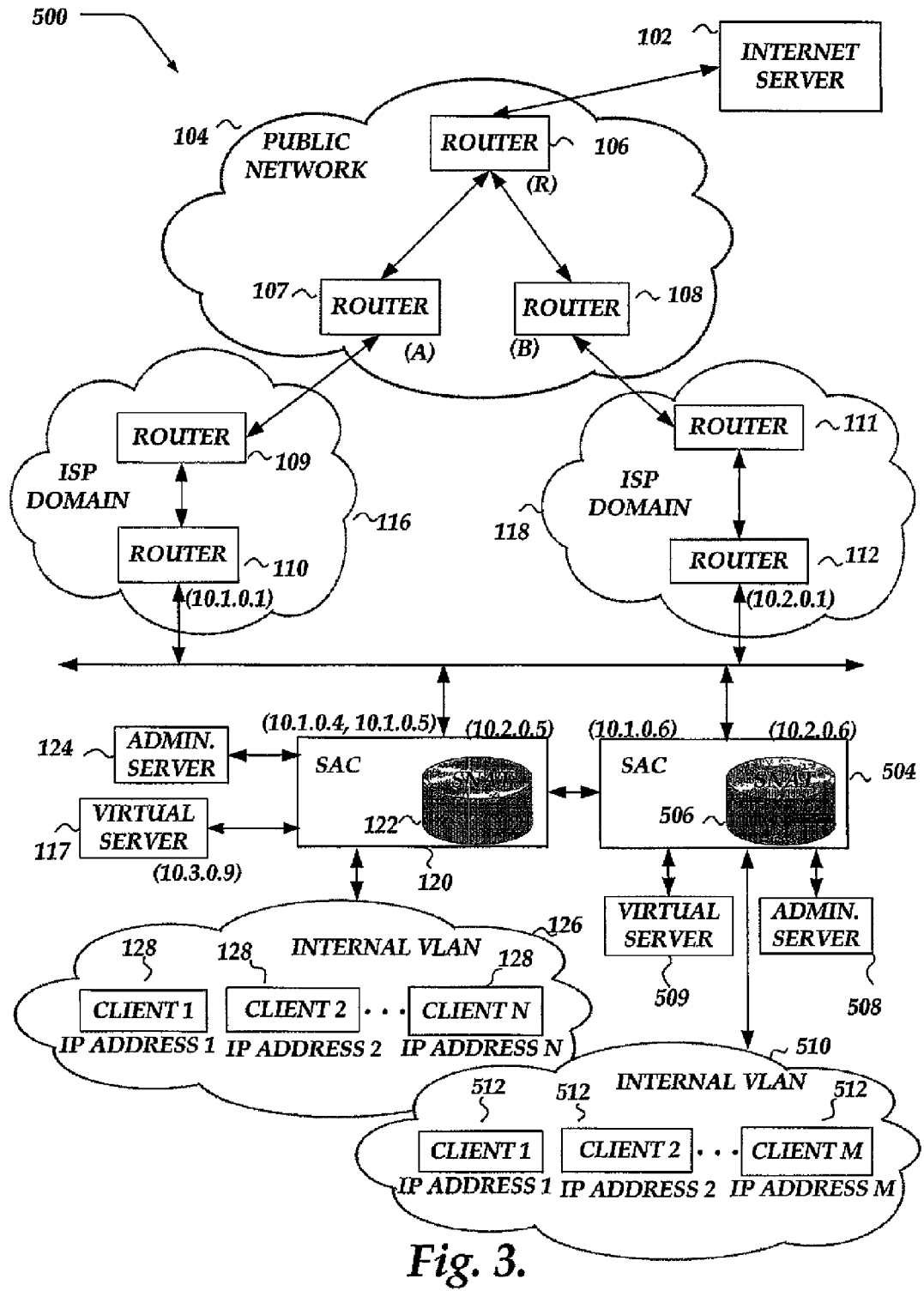
FIG. 3 illustrates a schematic system diagram of another exemplary embodiment incorporating active/active fail-over redundancy.

FIG. 3 shows a schematic system diagram of another exemplary system 500 incorporating active/active failover for multiple server array controllers, according to an embodiment of the present invention. Like components from FIGS. 1 and 3 are labeled substantially the same. Included in FIG. 3, however, is a second Server Array Controller (SAC) 504, a second Secure Network Address Translator (SNAT) 506, a second administration (admin) server 508, and second internal VLAN 510 which includes clients 512 (1 through M).

Server Array Controller (SAC) 504 is coupled to and in communications with routers 110 and 112. Coupled to SAC 504 is shown Administration (Admin) Server 508, which provides communications to SAC 504 and access to SNAT 506. SAC 504 is also coupled to SAC 120 to provide a communications path between SACs 504 and 120. The communications path between SAC 120 and SAC 504 is configured to provide sharing of network address tables and other information between SNAT 122 and SNAT 506, thereby enabling active/active redundancy in the event that one SAC/SNAT configuration fails. Moreover, SAC 504 handles communications for virtual server 509.

SAC 504 is also coupled to Internal VLAN 510, which provides a communications path between clients 512 (1 through M) and SAC 504.

Clients 512 (1 through M) are shown within Internal VLAN 510. However, as described above in conjunction with FIG. 1, the internal network architecture employed need not be a VLAN. For example, a LAN could also be employed, without departing from the scope or spirit of the present invention.

Moreover, it is apparent that system 500 may be extended by inclusion of additional SNATs, SACs, VLANS, and clients in a substantially similar configuration as described above, without departing from the spirit or scope of the invention.

Figure 4:
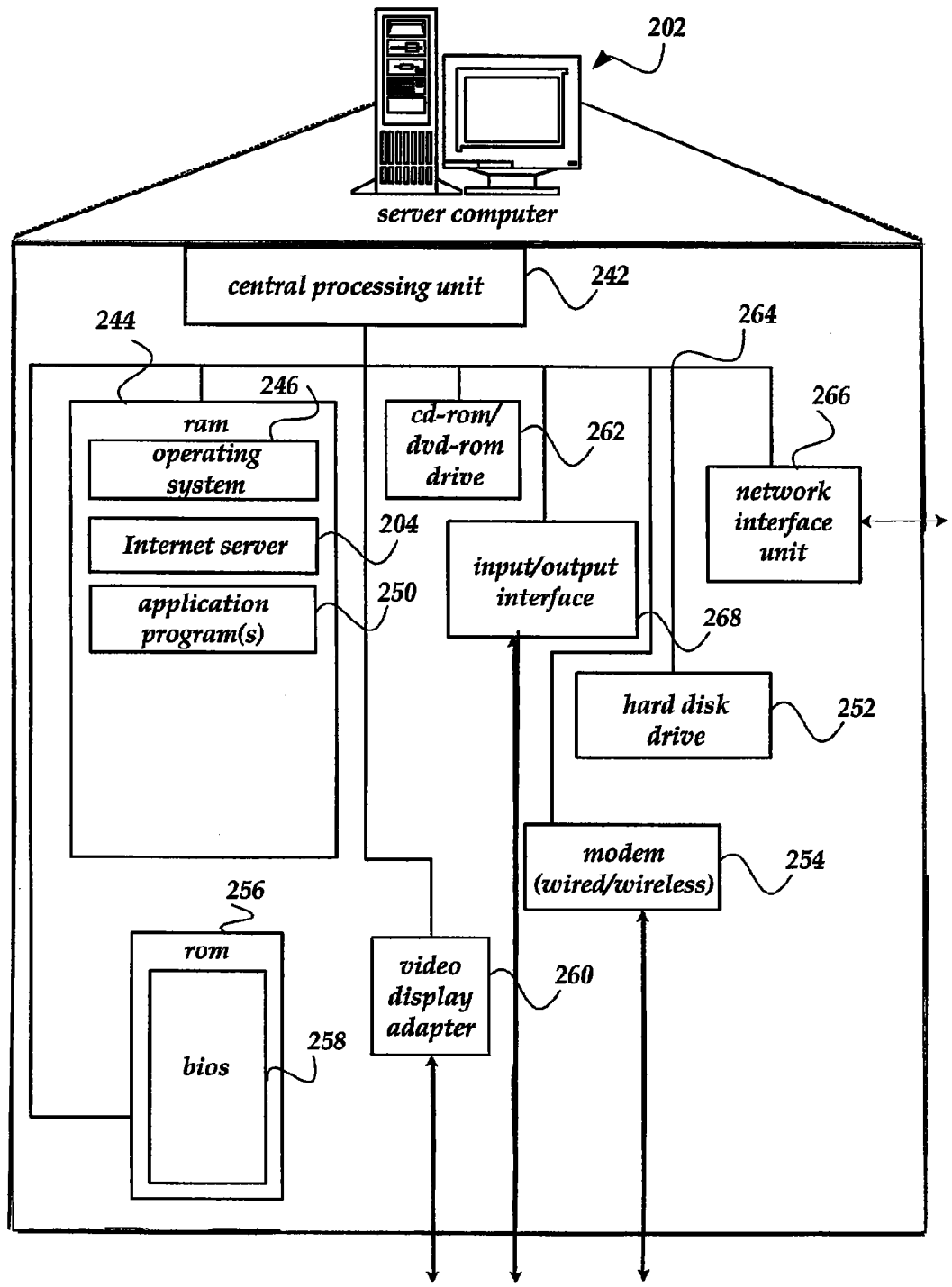
FIG. 4 is a block diagram of an embodiment of a server computer as portrayed in FIG. 1.

FIG. 4 shows an exemplary server computer 202 for enabling operation of Internet server 204 on a public network 104 (see FIG. 1), according to an embodiment of the present invention. Server computer 202 is configured to enable Internet server 204 to respond to requests for information. The requests may be provided by content server 306 or other application programs 334, which are executing on exemplary client computer 300 (see FIG. 5). For instance, server computer 202 can transmit data, forms, or other information in response to a request for information. These transactions can take place over the Internet or some other type/combination of communications networks.

Server computer 202 may include many more components than those shown. As illustrated in FIG. 4, server computer 202 can communicate with the Internet, or some other communications network, via network interface unit 266 that is constructed for use with various communication protocols including the TCP/IP protocol.

Server computer 202 also includes processing unit 242, video display adapter 260, and a mass memory, all in communication with each other via bus 264. The mass memory generally includes RAM 244, ROM 256, and one or more permanent mass storage devices, such as hard disk drive 252, tape drive, optical drive, and/or floppy disk drive. The mass memory stores operating system 246 for controlling the operation of server computer 202. A general-purpose server operating system may be employed, e.g., UNIX, LINUX™, Microsoft WINDOWS NT®, or the like. Basic input/output system ("BIOS") 258 is also provided for controlling the low-level operation of server computer 202.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tapes, magnetic disks storage or other magnetic storage devices, or any other medium which can be used to store the desired information and which can be accessed by a computing device.

The mass memory also stores program code and data for providing a presence on a network. More specifically, the mass memory stores application programs, data, and Internet server 204. These application programs include computer executable instructions which, when executed on server computer 202, generate response messages and perform the logic described elsewhere in this specification. Server computer 202 also has other application programs 250 that perform logical operations. Server computer 202 may also include an SMTP handler application for transmitting and receiving e-mail, an HTTP handler application for receiving and handing HTTP requests, and an HTTPS handler application for handling secure connections. The HTTPS handler application may initiate communication with an external security application or a credit card processing application for communicating with remote financial institutions in a secure fashion.

Server computer 202 also includes input/output interface 268 for communicating with external devices, such as a mouse, keyboard, scanner, or other input devices not shown in FIG. 4. Likewise, server computer 202 may further include additional mass storage facilities such as CD-ROM/DVD-ROM drive 262 and hard disk drive 252. Hard disk drive 252 is utilized by server computer 102 to store, among other things, application programs, databases, and program data used by the Internet server 204. For example, customer databases, product databases, image databases, and relational databases may be stored.

Although not shown, another embodiment of the server computer illustrated in FIG. 4 may be configured in a substantially similar way to enable the operation of at least one SAC and at least one SNAT application. Additionally, yet another embodiment of the server computer can be implemented as a "blade" server where the term "blade" refers to one of multiple computer cards that are installed in a hardware chassis with a backplane. An exemplary blade may include one or more processors, volatile and non-volatile memory, interfaces suitable for communicating information to and from the blade, and other components for enabling the operation of one or more applications, e.g., a SAC, SNAT, and the like. A blade may also include a specialized interface for the backplane and other interfaces, such as a USB port, FIREWIRE port, serial port, RF interface, IR interface, Ethernet interface, IDE controller, and the like. An application running on a blade may employ any of these interfaces to communicate information to other applications running on other blades and/or devices coupled to the blade server.

Figure 5:
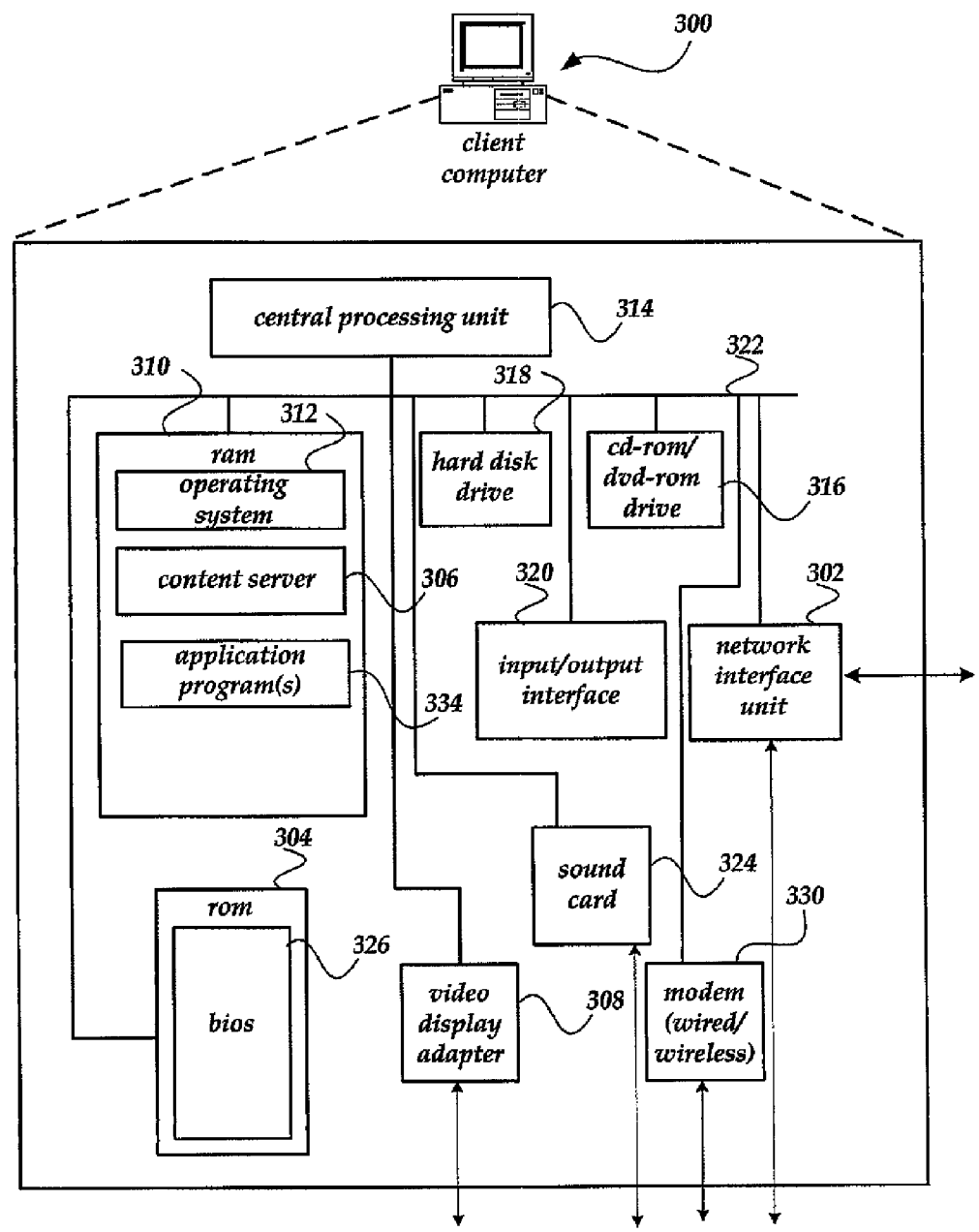
FIG. 5 is a block diagram of an embodiment of a client computer as portrayed in FIG. 1.

FIG. 5 is a block diagram of an embodiment of client computer 300 as portrayed in FIG. 1, in accordance with the present invention. Although client computer 300 may include many more components than those shown in FIG. 5, it is unnecessary that those generally conventional components be shown in order to disclose an illustrative embodiment. As shown in FIG. 5, client computer 300 includes network interface unit 302 for connecting to a LAN, VLAN, or WAN, or for connecting remotely to a LAN, VLAN, or WAN. Network interface unit 302 includes necessary circuitry for such a connection, and is constructed for use with various communication protocols including the TCP/IP protocol, the particular network configuration of the LAN, VLAN, or WAN it is connecting to, and a particular type of coupling medium. Network interface unit 302 may also be capable of connecting to the Internet through a point-to-point protocol ("PPP") connection or a serial line Internet protocol ("SLIP") connection as known to those skilled in the art.

Additionally, modem 330 is in communication with central processing unit 314 via bus 322 and enables client computer 300 to place a call to or receive a call from a telephone number. Modem 330 may be a wired and/or wireless telephonic device capable of transmitting voice and/or data.

Client computer 300 also includes BIOS 326, central processing unit 314, video display adapter 308, and memory. The memory generally includes random access memory ("RAM") 310, read-only memory ("ROM") 304 and a permanent mass storage device, such as disk drive 318. The memory stores operating system 312 and other application programs 334 for controlling the operation of client computer 300. The memory also includes content server 306, for providing content in response to requests from other content servers, clients, Internet servers, and the like, on a network, such as the Internet. The application programs, and content may be stored on a computer-readable medium and loaded into memory of client computer 300 using a drive mechanism associated with the computer-readable medium, such as a floppy drive (not shown), CD-ROM/DVD-ROM drive 316 or some other optical drive, or hard drive 318. Input/output interface 320 may also be provided for receiving input from a mouse, keyboard, or other input device. The memory, network interface unit 302, video display adapter 308, and input/output interface 320, modem 330 are all connected to central processing unit 314 via bus 322. Additionally, modem 330 may be a wired or wireless telephonic device capable of transmitting data and/or voice communications. Other peripherals may also be connected to central processing unit 314 in a similar manner.

Generalized Operation

The operation of automatically selecting a global IP network address for network address translations based on a corresponding available gateway will now be described with respect to FIGS. 6-9, which illustrate one embodiment of a process of the invention.

It will be understood that each 'block' or step in the illustrations (FIGS. 6-9), and combinations of blocks or steps in the illustrations, can be implemented by computer program instructions. These program instructions may be provided to a processor to produce a machine, such that the instructions, which execute on the processor, create means for implementing the actions identified in the flowchart blocks and steps. The computer program instructions may be executed by a processor to cause a series of operational steps to be performed by the processor to produce a computer implemented process such that the instructions which execute on the processor provide steps for implementing the actions specified in the flowchart blocks and steps.

Accordingly, the blocks and steps of the illustrations support combinations of means for performing actions, combinations of steps for performing the actions and program instruction means for performing the actions. It will also be understood that each block of the flowchart and the illustrated steps, and combinations of blocks in the flowchart and illustrated steps, can be implemented by special purpose hardware-based systems which perform the specified actions, or combinations of special purpose hardware and computer instructions.

Selection of a Global Address Corresponding to a Selected Gateway

Figure 6:
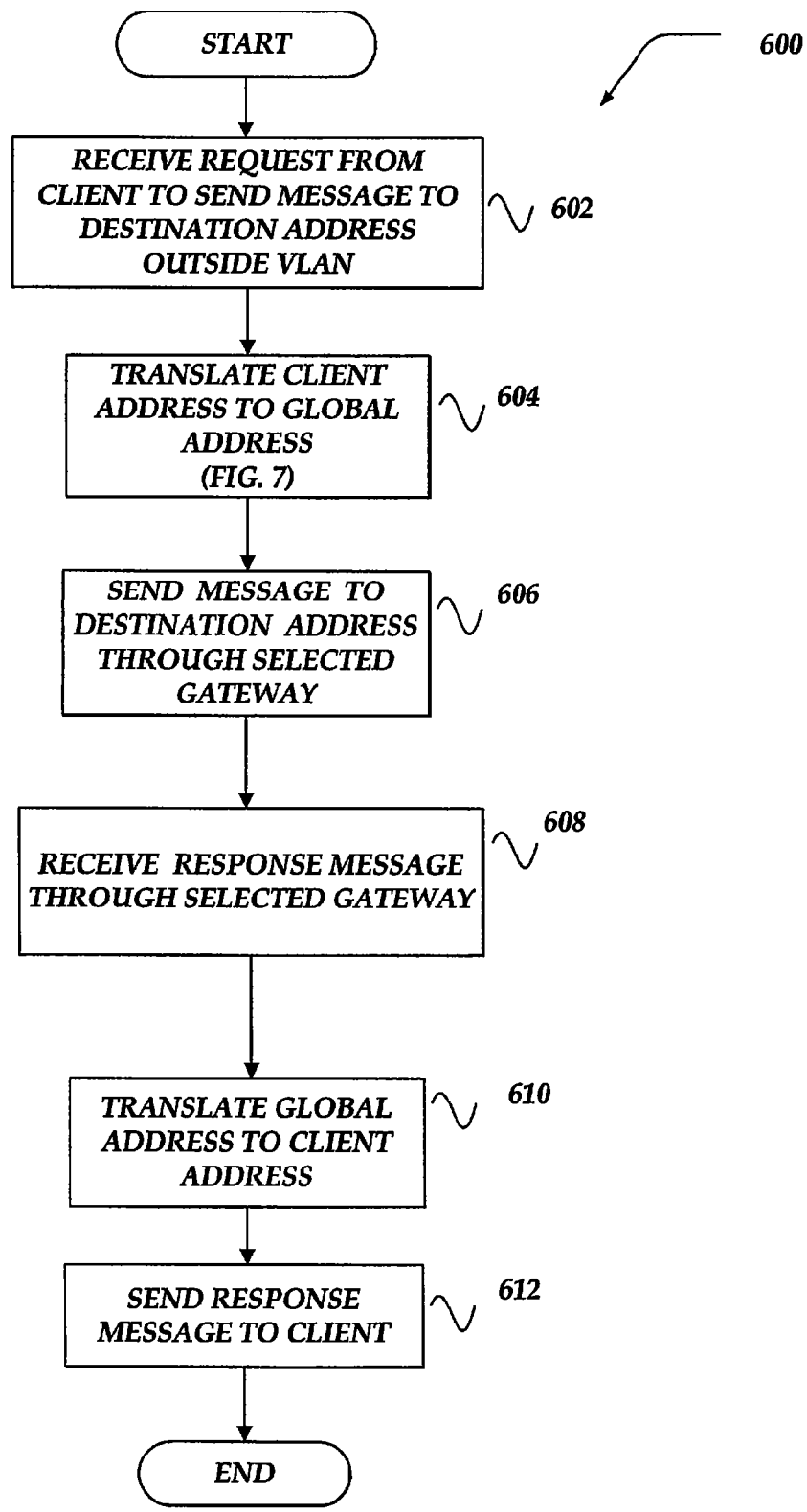
FIG. 6 shows a flow diagram illustrating an embodiment of a process for communicating client requests for information from a destination address outside of the client's network.

FIG. 6 illustrates a logical flow diagram generally showing one embodiment of a process for communicating client's requests for information from a destination address outside of the client's network. Briefly, the client communications process 600 disclosed in FIG. 6 is employed to complete a client's request to communicate outside of its network through the selection of a gateway and a corresponding global address.

Client communications process 600 begins, after a start block, at block 602 where a client request to send a message outside of its local network is received. The client may be requesting information from a destination address in response to another client's request for information. In one embodiment, the requesting client may be sending a message to provide information to the destination address. In either event, the requesting client is likely "hidden" within a local network, such as a VLAN. Moreover, the requesting client's IP address is likely to be a local address that has not been registered with a registration authority, such as IANA.

The process moves to block 604 to provide translation of the requesting client's local address to a global address. The actions at block 604 are explained in further detail in the discussion of FIG. 7 below. Briefly, however, because the requesting client's local address may not be readily available outside of the client's network, its local address is translated to a global address that is enabled for use over the Internet. At Block 604, the global address is selected to enhance the likelihood that the same gateway is employed to send the message and receive the response from the destination address. In one embodiment, the translation in block 604 is performed by an automap of the local address stored in the source address location of the IP packet to the global address corresponding to a selected gateway. Details of the selection of the gateway are illustrated in FIG. 8 and the related discussion below.

Next, process proceeds to block 606 where the requesting client's message with the translated global address is sent to the destination address through the selected gateway. The process advances to block 608 where a response to the requesting client's message is received through the selected gateway.

Moving to block 610, the global address within the destination address of the response message is translated to the requesting client's local address. The process moves to block 612, where the response message is sent to the requesting client. Next, the process moves to an end block and returns to processing other actions.

Translating a Requesting Client's Local Address to Global Address

Figure 7:
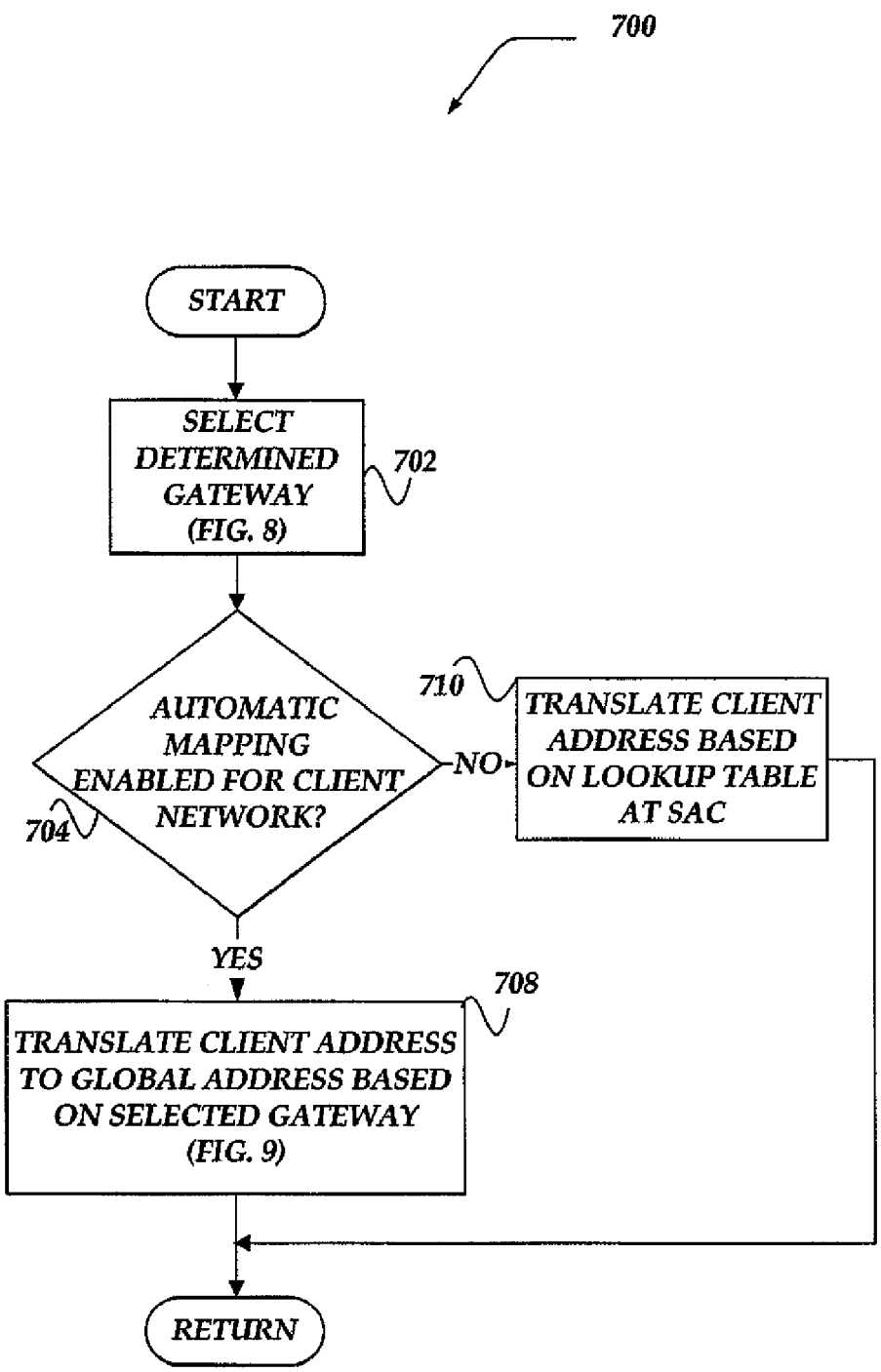
FIG. 7 illustrates a flow diagram showing an embodiment of a process for translating a client address to a global address.
Figure 8:
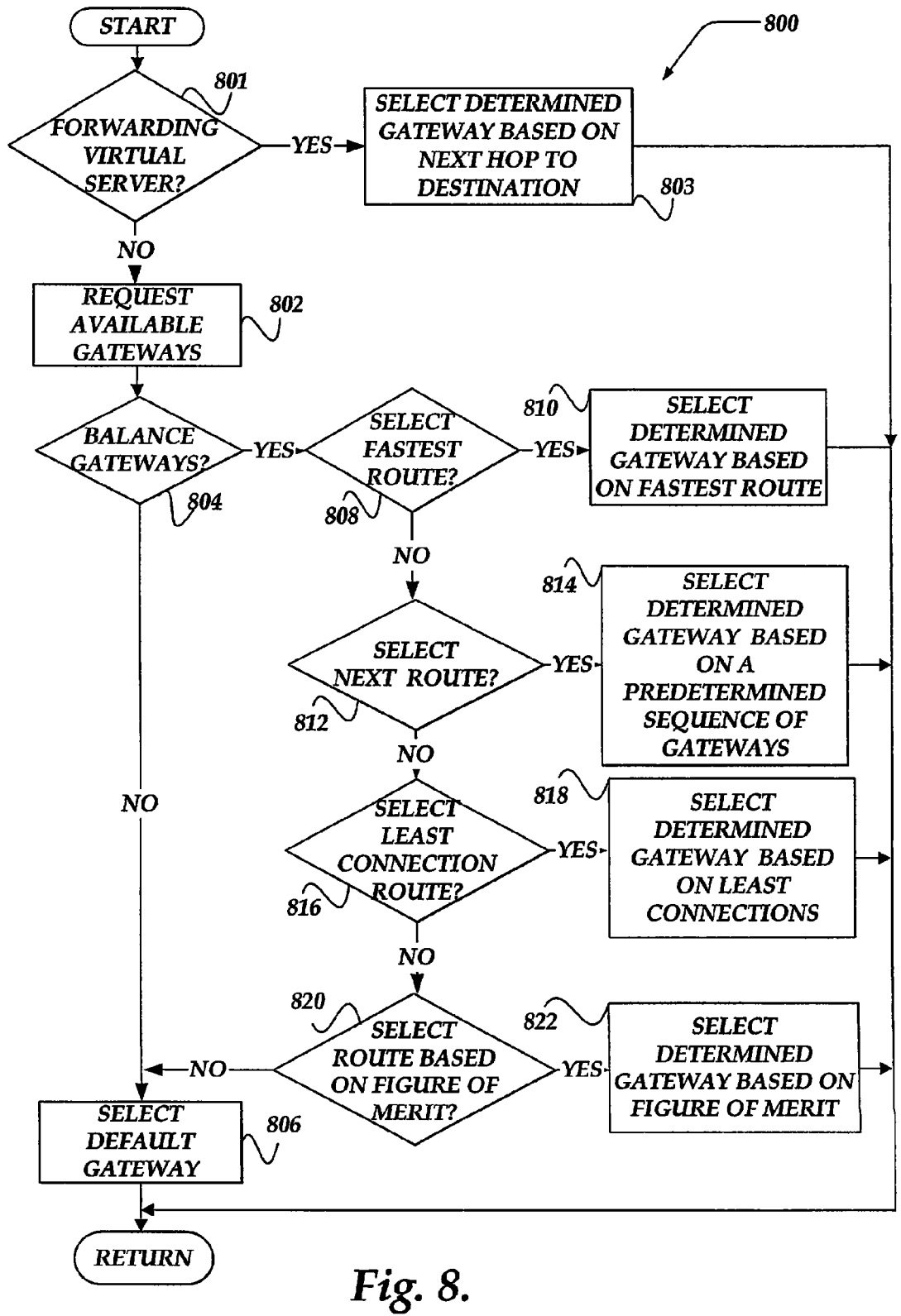
FIG. 8 illustrates a flow diagram showing a process to select a balanced ISP gateway.

FIG. 7 illustrates a logical flow diagram generally showing an embodiment of a process for translating the requesting client's local address to a global address, as described briefly above at block 604 in FIG. 6. The process begins, after a start block, at block 702 where a determined gateway is selected. The actions at block 702 are explained in FIG. 8 and the related discussion.

Moving to decision block 704, a determination is made whether a requesting client's network has been enabled for automatic mapping of addresses. Referring briefly to FIG. 10, an illustration is shown of one embodiment of source-destination network address translation (NAT) tables. As shown in this figure, NAT 1010 illustrates a mapping of client addresses directly to predetermined global addresses 1012, while NAT 1020 illustrates automatic mapping of client addresses for auto-selected 1022 global addresses.

If the determination at decision block 704 is negative, the process moves to block 710 where the requesting client's address is translated to a global address based on a lookup table. In one embodiment, the lookup table includes predetermined addresses at a SAC. Upon completion of the actions at block 710, the process returns to block 606 (shown in FIG. 6) to perform other actions.

Alternatively, if the determination at decision block 704 is positive (automatic mapping of addresses is employed), the process continues to block 708 where the requesting client's local address is translated to a global address based on the determined gateway selected at block 702. Upon completion of the actions at block 708, the process returns to block 606 (shown in FIG. 6) to perform other actions.

Selection of a Determined Gateway:

FIG. 8 illustrates a logical flow diagram showing an embodiment of a process for selecting a determined gateway, as briefly described above at block 702 in FIG. 7. Process 800 begins, after moving from a start block, at block 801 where a determination is made whether a network connection is to be handled by a forwarding virtual server. A forwarding virtual server is a virtual server that is employed to route packets to the destination rather than load balance the packets across a set of devices.

At decision block 801, when the determination is positive, the process proceeds to block 803 where the requesting client's local address is translated based on a global address of the next network hop to the destination address. Upon completion of the actions at block 803, the process returns to block 702 (shown in FIG. 7) where substantially the same actions discussed above are performed.

Alternatively, at decision block 801, when it is determined that the network connection is not to handled by a forwarding virtual server, the process proceeds to block 802.

At block 802, a request is made for available gateways. In one embodiment, a gateway is determined to be available when network traffic through the gateway falls below a predetermined value. In another embodiment, the gateway is determined to be available when a network path and associated switches, routers, and the like are determined to be accessible. However, other embodiments also may be employed in determining available gateways. For example, a gateway may be determined to be available based on a cost or quality of service function, without departing from the spirit or scope of the present invention.

Upon completion of the actions at block 802, the process moves to decision block 804 where a determination is made whether the available gateways are to be load balanced. If, at decision block 804, the determination is negative, the process moves to block 806 where a default gateway is selected from the available gateways. In one embodiment, the default gateway is the first gateway in the list of available gateways. In another embodiment, the default gateway is predetermined by a System Administrator. Upon completion of the actions at block 806, the process returns to block 702 (shown in FIG. 7) to perform other actions.

Alternatively, at decision block 804, if the determination to load balance is affirmative, the process moves to decision block 808 where a determination is made whether the determined gateway is selected based on a fastest route. If the determination at decision block 808 is affirmative, the process moves to block 810. At block 810, the available gateway with the fastest route is selected as the determined gateway for routing the requesting client's message outside of the requesting client's network. Upon completion of the actions at block 810, the process returns to block 702 (shown in FIG. 7) to perform other actions.

Alternatively, if at decision block 808 the determination is false, the process proceeds to decision block 812 where a determination is made whether the determined gateway is selected, based on a next available gateway in a predetermined sequence of gateways. In one embodiment, the predetermined sequence of gateways is a round robin sequence of gateways. If at decision block 812, the determination is affirmative, the process moves to block 814.

At block 814, the next available gateway in the predetermined sequence of gateways is selected as the determined gateway for routing the requesting client's message outside of the requesting client's network. Upon completion of the actions at block 814, the process returns to block 702 (shown in FIG. 7) to perform other actions.

Alternatively, if at decision block 812, the determination is found to be false, the process proceeds to decision block 816 where a determination is made whether the determined gateway is selected based on a gateway with a least number of current connections. If at decision block 816, the determination is affirmative, the process moves to block 818. At block 818, the gateway with the least number of current connections is selected as the determined gateway for routing the requesting client's message outside of the requesting client's network. Upon completion of the actions at block 818, the process returns to block 702 (shown in FIG. 7) to perform other actions.

Alternatively, if at decision block 816, the determination is false, the process moves to decision block 820 where a determination is made whether the determined gateway is selected based on a figure of merit, such as quality of service. In one embodiment of the present invention, quality of service is determined by a gateway's capacity for connections. In another embodiment, the quality of service is a gateway's capacity to manage additional throughput. If at decision block 820, the determination is affirmative, the process continues to block 822. At block 822, the gateway that best satisfies the figure of merit is selected as the determined gateway for routing the requesting client's message outside of the requesting client's network. Upon completion of the actions at block 822, the process returns to block 702 (shown in FIG. 7) to perform other actions.

Alternatively, if at decision block 820, the determination is negative, the process proceeds to block 806, where a default gateway is selected as the determined gateway as described above. Upon completion of the actions at block 806, the process returns to block 702 (shown in FIG. 7) to perform other actions.

Translating a Requesting Client's Local Address Based on a Selected Gateway

Figure 9:
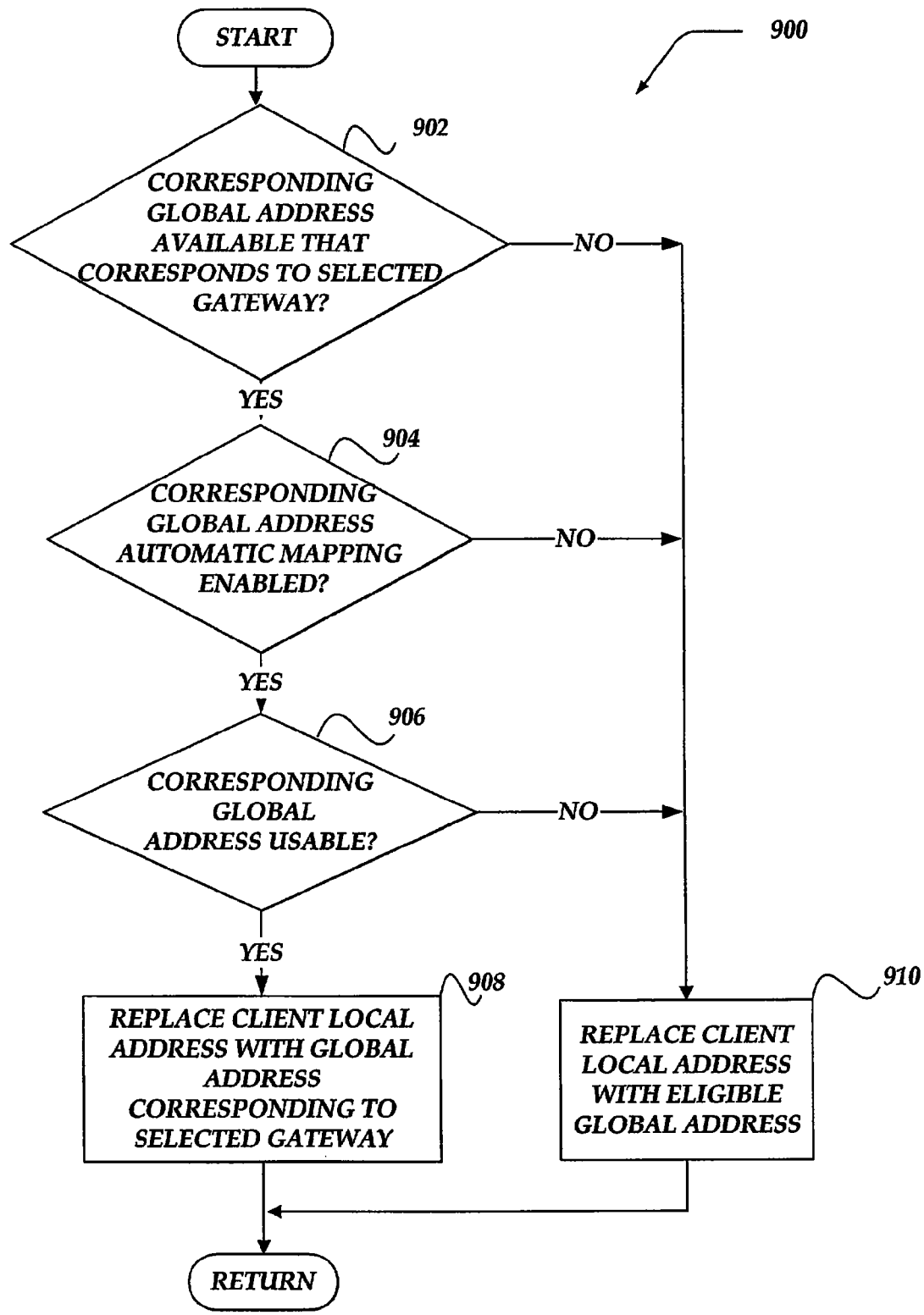
FIG. 9 illustrates a flow diagram showing a process to translate client addresses to global address based on a selected gateway.

FIG. 9 illustrates a logical flow diagram showing an embodiment of a process for translating a requesting client's local address to a global address based on the selected gateway, as briefly described above at block 708 in FIG. 6. The process 900 begins, after moving from a start block, at decision block 902 where a determination is made whether a global address is available that corresponds to the determined gateway selected at block 702 in FIG. 7. If, at decision block 902, the determination is negative, the process proceeds to block 910.

At block 910, the requesting client's local address in the message packet (the source address field) is replaced by an eligible global address. In one embodiment of the present invention, the eligible global address is a global address that is available for the destination address. Upon completion of the actions at block 910, the process returns to after block 708 in FIG. 7, to perform other actions.

Alternatively, if at decision block 902 the determination is affirmative, the process moves to decision block 904 where a determination is made whether the corresponding global address is enabled for automap. Decision block 904 is directed at avoiding consumption of global addresses when the requesting client's message is not expected to go over the Internet. Such a situation may arise for example, when a requesting client is attempting to communicate with a "local" device, such as another client, system administration device, or the like on the same VLAN. If at decision block 904, the determination is negative, the process proceeds to block 910, to perform substantially the same actions as described above.

Alternatively, if at decision block 904, the determination is affirmative, the process proceeds to decision block 906 where a determination is made whether the corresponding global address is usable. In one embodiment of the present invention, the corresponding global address is unusable if the TCP address ports are exhausted. TCP address ports may be exhausted for example due to an overloading of addresses. If at decision block 906, the determination is negative, process flow control proceeds to block 910, to perform substantially the same actions described above.

Alternatively, if at decision block 906, the determination is affirmative, process control flow continues to block 908 where the requesting client's local address in the message packet (the source address field) is replaced by the available corresponding global address that is "automap enabled and usable." Upon completion of the actions at block 908, the process returns to block 708 in FIG. 7, to perform other actions.

Although the flow diagrams of FIGS. 6-9 illustrate the translation of client addresses, the present invention may employ other embodiments such as a mapping function. For example, a particular client address may be matched to an entry in a table, which includes a function. The function performs an algorithm, such as fastest route, least connections, and the like, to select a member gateway from a pool of possible gateways. The function also is enabled to map the client address to a selected gateway.

Other Features of the Present Invention

As discussed above in conjunction with FIG. 3, the present invention provides for improved management and sharing of network address tables when multiple server array controllers (SAC) are employed in an active/active configuration. During an active/active configuration, the multiple SACs each are considered active and automatically mapping addresses. When one of the multiple SACs fails, the mapping of addresses managed by the failed SAC is performed by another SAC in the active/active multiple SAC configuration. When the failed SAC comes back on line, the tables and related connections are readily partitioned and reallocated to the active SNATs. This flexibility enables an organization to employ multiple SAC/SNAT configurations in the active/active mode, and thereby increase redundancy.

Additionally, the present invention provides an increased number of open connections over traditional implementations, by automatically mapping TCP ports across multiple global addresses. By automatically mapping TCP ports, ports appear as ephemeral ports across multiple global addresses. As such, the present invention enables an increased number of simultaneous connections through a SAC, by employing virtually the same ephemeral port on multiple global addresses.

The above specification, examples, and data provide a complete description of the manufacture and use of the composition of the invention. Since many embodiments of the invention can be made without departing from the spirit and scope of the invention, the invention resides in the claims hereinafter appended.

I claim:

1. A network device for routing messages between a plurality of networks, comprising:
   one or more transceivers receiving and sending network messages; and
   one or more processors configured to perform actions, including:
      receiving, from a client device residing on a local network, a message destined for another network device outside of the local network;
      selecting a gateway device outside of the local network for routing the message based on a selected network characteristic;
      automatically mapping a source address in the message to an available global address corresponding to the selected gateway device to generate a modified message;
      forwarding the modified message to the selected gateway, such that the selected gateway is further configured to receive a response to the forwarded modified message; and
      sharing a network address table with another network device, the network address table including the source address and the global address, such that the shared network address table is useable by the network device or the other network device during a failure of one of the network device or the other network device to process the response to the forwarded modified message.

2. The network device of claim 1, wherein the local network is a virtual LAN (VLAN).

3. The network device of claim 1, wherein the one or more processors are configured to perform actions, further including: inhibiting LAN connections from another client device outside of the local network.

4. The network device of claim 1, wherein selecting the gateway device further comprises selecting the gateway device based on at least one of a fastest route, or a figure of merit.

5. The network device of claim 1, wherein the network device is a server array controller configured to employ a secure network address translator that is further configured to perform auto mapping of global addresses corresponding to the selected gateway device.

6. A system for routing network message traffic, comprising:
   a client device residing on a local network and configured to communicate with a plurality of network devices residing on a network other than the local network on which the client device resides; and
   a first network device configured to perform actions, including:
      receiving, from the client device, a message destined for a second network device that is outside of the local network;
      selecting a gateway device outside of the local network for routing the message to balance a load across a plurality of gateway devices based on a network characteristic;
      automatically mapping a source address in the message to an available global address corresponding to the selected gateway device to generate a modified message; and
      forwarding the modified message towards the selected gateway, such that a response to the forwarded message is received by the selected gateway;
      sharing a network address table with another network device, the network address table including the source address and the global address, such that the shared network address table is useable by the network device or the other network device during a failure of one of the network device or the other network device to process the response to the forwarded message.

7. The system of claim 6, wherein the local network is a virtual LAN (VLAN).

8. The system of claim 6, wherein selecting the gateway device further comprises selecting the gateway device based on a predetermined sequence of gateway devices, or based on a gateway device having a least number of connections over another gateway device in the plurality of gateway devices.

9. The system of claim 6, wherein the global address is determined to be unavailable for automatic mapping if the global addresses TCP address ports are exhausted.

10. The system of claim 6, wherein the network device is operative to perform actions, further including: inhibiting mapping of the source address in another message, if it is determined that the other message is to be routed to a third network device that resides on the local network.

11. The system of claim 6, wherein the first network device is a server array controller.

12. The system of claim 6, wherein determining if the client address is enabled for automatic mapping further comprises examining a source-destination network address translation table for the client address identification.

13. A non-transitory computer-readable storage medium having computer-executable instructions stored thereon, which when executed by one or more processors coupled to a network message traffic handling device, causes the device to perform actions comprising:
   receiving, from a client device residing on a local network, a message destined for a network device outside of the local network;
   selecting a gateway device outside of the local network for routing the message based on a network characteristic to load balance a plurality of gateway devices;
   automatically mapping a source address in the message to an available global address corresponding to the selected gateway device to generate a modified message; and
   forwarding the modified message to the selected gateway, wherein the selected gateway receives a response to the modified message;
   sharing a network address table with another network message traffic handling device, the network address table including the source address and the global address, such that the shared network address table is useable by the network message traffic handling device or the other network message traffic handling device during a failure of one of the network message traffic handling device or the other network message traffic handling device to process the response to the modified message.

14. The non-transitory computer-readable storage medium of claim 13, wherein if a network connection is determined to be handled by a forwarding virtual server, translating the source address in the message to a global address of a next network hop to a destination address.

15. The non-transitory computer-readable storage medium of claim 13, wherein the global address is determined to be available if TCP address ports for the global address are not exhausted.

16. The non-transitory computer-readable storage medium of claim 13, wherein the local network is a virtual LAN (VLAN).

17. The non-transitory computer-readable storage medium of claim 13, wherein the network device is coupled to a public network.

* * * * *

UNITED STATES PATENT AND TRADEMARK OFFICE
CERTIFICATE OF CORRECTION

PATENT NO.        : 8,108,554 B1
APPLICATION NO.   : 12/259142
DATED             : January 31, 2012
INVENTOR(S)       : Richard Roderick Masters It is certified that error appears in the above-identified patent and that said Letters Patent is hereby corrected as shown below:

Column 8, line 25, delete "VLANS," and insert -- VLANs, --, therefor.

Signed and Sealed this
Seventeenth Day of April, 2012

David J. Kappos
*Director of the United States Patent and Trademark Office*